United States Patent
Li et al.

(10) Patent No.: US 8,911,298 B2
(45) Date of Patent: Dec. 16, 2014

(54) TORQUE LIMITER

(71) Applicants: Hong Fu Jin Precision Industry (ShenZhen) Co., Ltd., Shenzhen (CN); Hon Hai Precision Industry Co., Ltd., New Taipei (TW)

(72) Inventors: Bing Li, Shenzhen (CN); Bo Yang, Shenzhen (CN); Yong Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/016,225

(22) Filed: Sep. 3, 2013

(65) Prior Publication Data
US 2014/0080609 A1  Mar. 20, 2014

(30) Foreign Application Priority Data

Sep. 20, 2012  (CN) .......................... 2012 1 03510952

(51) Int. Cl.
*F16D 7/04* (2006.01)
*F16D 7/02* (2006.01)
*F16D 43/202* (2006.01)

(52) U.S. Cl.
CPC ................ *F16D 7/024* (2013.01); *F16D 7/044* (2013.01); *F16D 43/2024* (2013.01)
USPC .......................................................... 464/39

(58) Field of Classification Search
USPC .......................... 464/37–39; 192/56.52, 56.53
See application file for complete search history.

(56) References Cited

U.S. PATENT DOCUMENTS

| 1,082,771 | A | | 12/1913 | Russell |
| 2,764,882 | A | * | 10/1956 | Bosworth ........................ 464/39 |
| 3,136,400 | A | | 6/1964 | Carr |
| 4,093,055 | A | * | 6/1978 | Blackburn et al. .......... 464/39 X |

FOREIGN PATENT DOCUMENTS

| GB | 554979 | * | 7/1939 | ...................... 464/39 |
| TW | 1372216 B | | 9/2012 | |

* cited by examiner

*Primary Examiner* — Gregory Binda
(74) *Attorney, Agent, or Firm* — Novak Druce Connolly Bove + Quigg LLP

(57) ABSTRACT

A torque limiter includes an input shaft connected to a driving source, an output shaft connected to a driven load, a shaft sleeve, and an adjustment mechanism. The input shaft includes a positioning post. The output shaft includes a resisting post. The shaft sleeve includes a cam surface and a resisting surface, and defines a cam groove in a periphery. When the driven load is in a predetermined torque range, the positioning post is engaged in the cam groove, the output shaft is rotated by the input shaft and drives the driven load. When the driven load reaches overload torque amount, the cam surface moves relative to the resisting post, the cam surface is separated from the resisting post, such that the input shaft is separated from the output shaft. Thus, the output shaft and the driven load are protected from damaged by torque overload.

15 Claims, 5 Drawing Sheets

TORQUE LIMITER

BACKGROUND

1. Technical Field

The present disclosure relates to torque limiters, and particularly to a torque limiter used in an automatic device.

2. Description of the Related Art

A torque limiter, named also as an overload clutch or a safety coupling, interconnects an input shaft and an output shaft. When encountering or receiving an overloaded amount of torque, the torque limiter disconnects the input shaft and the output shaft, such that a driving source and a driven load are protected from damaged by the torque overload.

A typical friction-style torque limiter includes a housing, a transmission shaft connected to a driving source, and an output shaft connected to a driven load. A plurality of friction plates are mounted on the transmission shaft and the output shaft, and are received in the housing. The friction plates on the transmission shaft are resisted between the friction plates on the output shaft and a pressing plate. The pressing plate is rotated by the transmission shaft. When the output shaft is overloaded by an amount of torque, the friction plates on the transmission shaft slip relative to the friction plates on the output shaft and the pressing plate, such that the driving source and the driven load are protected from damaged by the torque overload. However, the friction plates may be worn down from usage, so that a predetermined torque overload value is reduced, and is needed to be adjusted.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
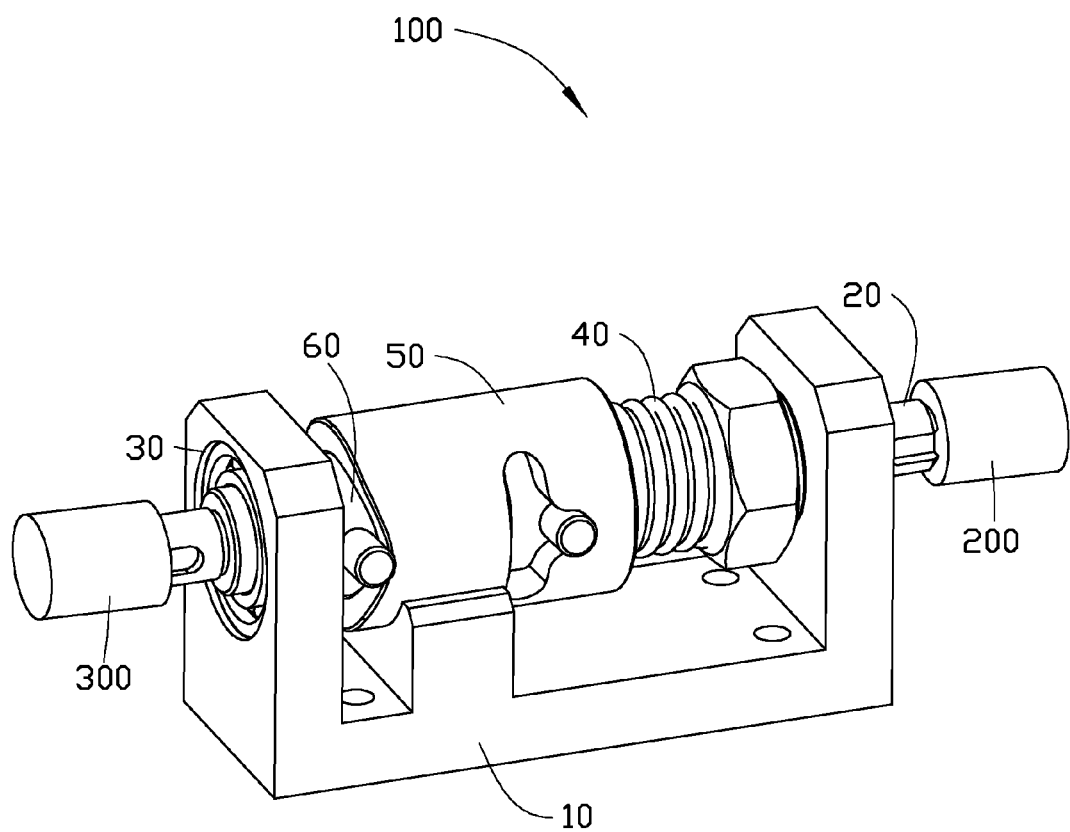
FIG. 1 is an assembled, isometric view of one embodiment of a torque limiter.
Figure 2:
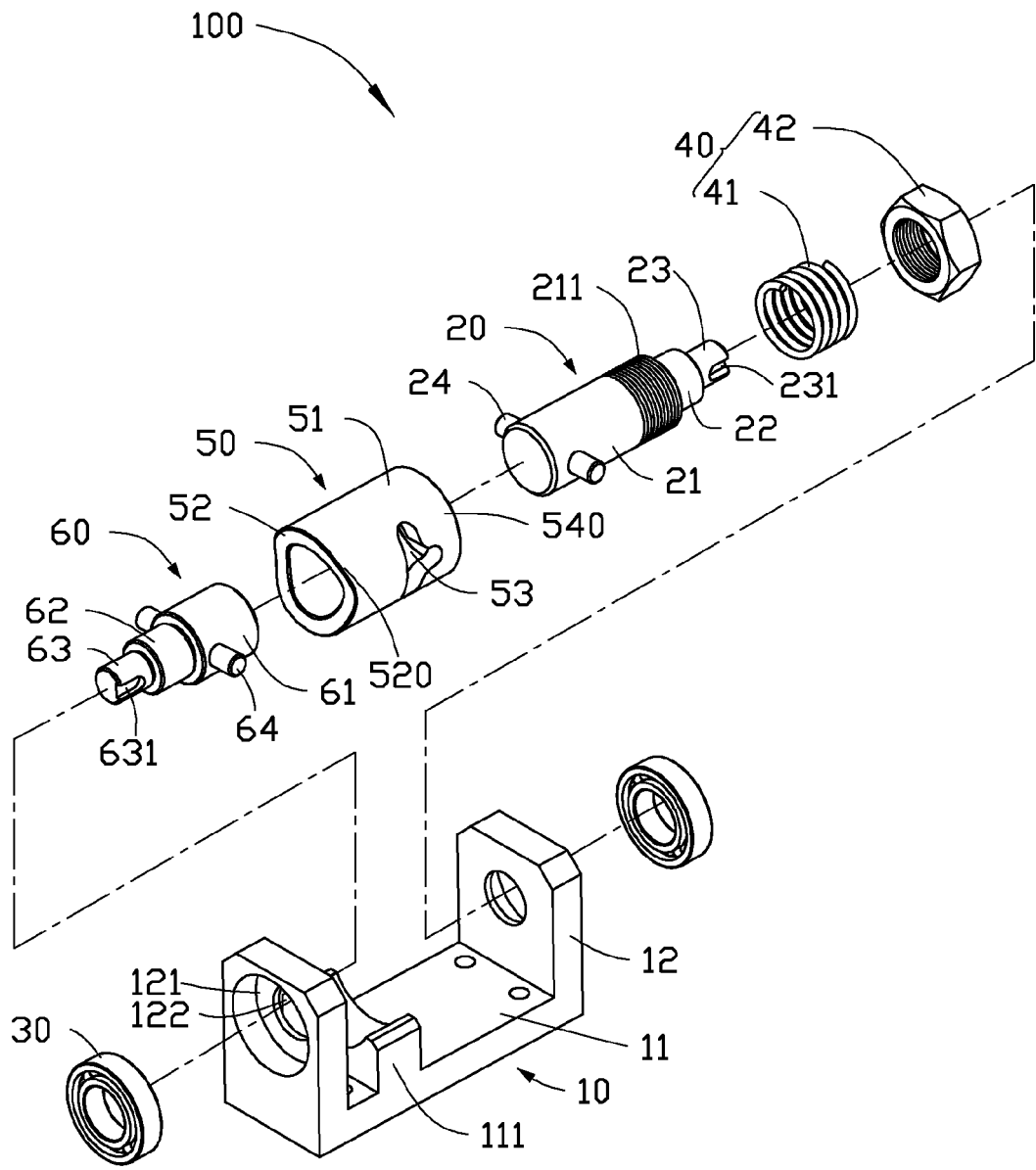
FIG. 2 is an exploded, isometric view of the torque limiter of FIG. 1, the torque limiter comprising a shaft sleeve.

FIGS. 1 and 2 show one embodiment of a torque limiter 100. The torque limiter 100 includes a mounting seat 10, an input shaft 20, two bearings 30, an adjustment mechanism 40, a shaft sleeve 50, and an output shaft 60. The input shaft 20 is rotatably mounted on the mounting seat 10 by one of the two bearings 30. The output shaft 60 is rotatably mounted on the mounting seat 10 by the other one of the two bearings 30. The input shaft 20 and the output shaft 60 are substantially coaxial and positioned spaced from each other. The shaft sleeve 50 interconnects the input shaft 20 to the output shaft 60. The adjustment mechanism 40 is placed on one end of the input shaft 20 away from the output shaft 60. In use, the input shaft 20 is connected to a driving source 200, and the output shaft 60 is connected to a driven load 300.

The mounting seat 10 includes a bottom wall 11 and two support walls 12 substantially perpendicularly extending from opposite ends of the bottom wall 11. A mounting groove 121 is defined in an outer surface of each support wall 12. A through hole 122 is defined in a bottom surface of the mounting groove 121. The mounting groove 121 and the through hole 122 are substantially coaxial. The mounting seat 10 further includes a support protrusion 111 formed on the bottom wall 11. The support protrusion 111 is placed adjacent to one of the two support walls 12, for supporting the shaft sleeve 50. In other embodiments, the mounting groove 121 can be defined in an inner surface of the support wall 12.

The input shaft 20 is substantially cylindrical, and includes a first shaft body 21, a connection body 22, an input end 23, and two positioning posts 24. The first shaft body 21, the connection body 22, and the input end 23 are substantially coaxially connected in that order. The positioning posts 24 are substantially symmetrically formed on a side surface of the first shaft body 21, and positioned at one end of the first shaft body 21 opposite to the input end 23. In other embodiments, the number of the positioning post 24 can be one. A side surface of the first shaft body 21 at the other end thereof adjacent to the connection body 22 is threaded, thereby forming a threaded portion 211. A latching portion 231 is formed on the input end 23, for latching with the driving source 200. In the embodiment, a diameter of the first shaft body 21 is greater than that of the connection body 22, and the diameter of the connection body 22 is greater than that of the input end 23.

The adjustment mechanism 40 includes a spring 41 and a nut 42. The spring 41 is sleeved on the first shaft body 21. The nut 42 is threaded with the threaded portion 211, and resists against one end of the spring 41. In other embodiments, the spring 41 can be of other elastic members.

Figure 3:
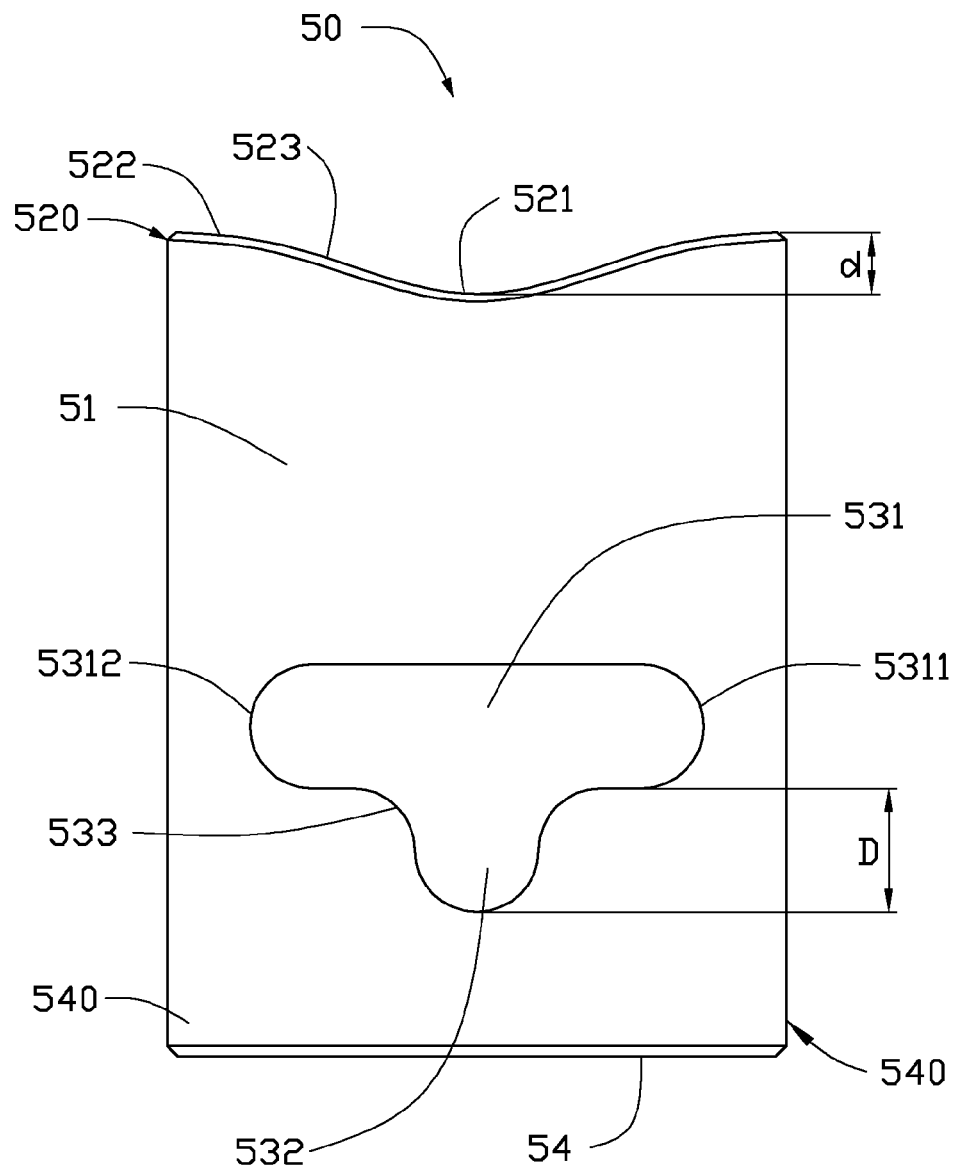
FIG. 3 is an enlarged, isometric view of the shaft sleeve of FIG. 2.
Figure 4:
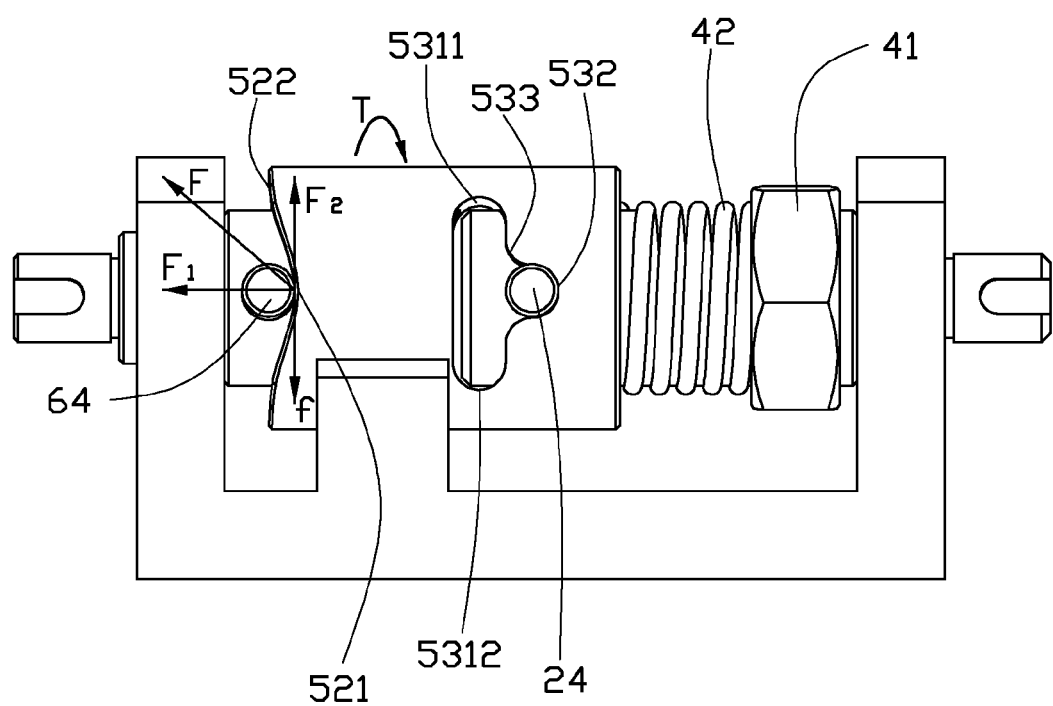
FIG. 4 shows the torque limiter of FIG. 1 in a normal operation.
Figure 5:
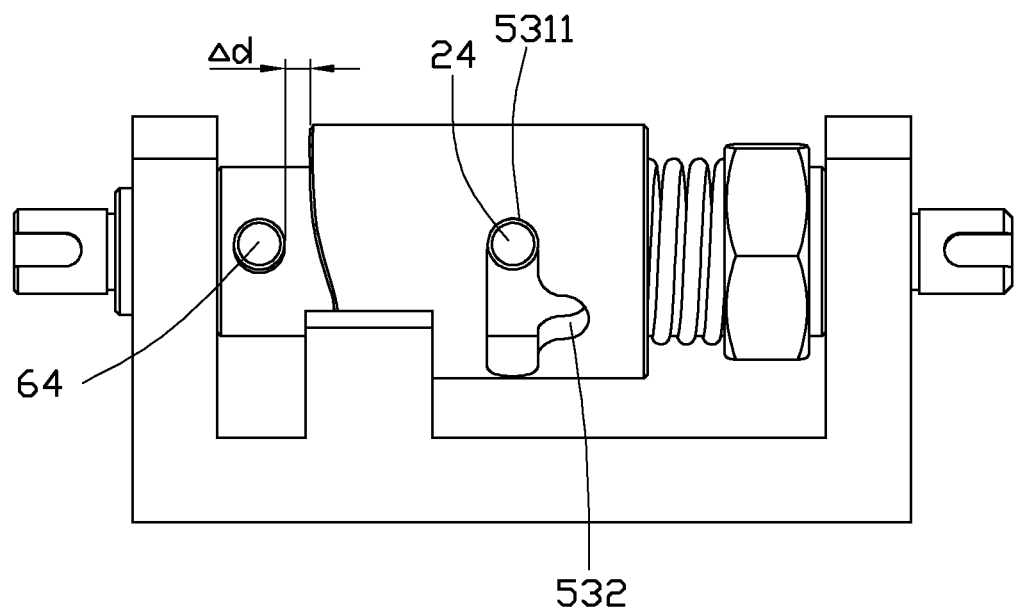
FIG. 5 is similar as FIG. 4, but showing the torque limiter in a protection state.

FIGS. 3 through 5 show the torque limiter 100 in more detail. The shaft sleeve 50 includes a main body 51, a cam end 520, and a resisting end 540. The cam end 520 and the resisting end 540 are formed on opposite ends of the main body 51. An end surface of the cam end 520 defines a cam surface 52. An end surface of the resisting end 540 defines a resisting surface 54. Two cam grooves 53 are symmetrically defined in a periphery of the main body 51 adjacent to the resisting end 540, and are engaged with the positioning posts 24. In other embodiments, the number of the cam grooves 53 can be changed to match the number of the positioning posts 24. The cam groove 53 includes a sliding groove 531, a positioning slot 532, and a guiding section 533 communicating with the sliding groove 531 and the positioning slot 532. The sliding groove 531 includes a first end 5311 and a second end 5312 opposite to the first end 5311. The positioning slot 532 is defined in a side of the sliding groove 531 away from the cam surface 52. That is to say, the positioning slot 532 is defined adjacent to the resisting end 540. The positioning post 24 can be positioned at the first end 5311, the second end 5312, or the positioning slot 532. The positioning post 24 can smoothly slide in the sliding groove 531 and be positioned at the first end 5311 or the second end 5312 via the guiding section 533. A distance from a bottom of the positioning slot 532 to a side surface of the sliding groove 531 adjacent to the positioning slot 532 is defined (or designated) as D. The cam surface 52 includes two concave portions 521, two top portions 522, and four connection portions 523. Each concave portion 521 is connected to the two top portions 522 by two connection portions 523. A distance from each concave portion 521 to one top portion 522 along an axial direction is defined (or designated) as d. In the illustrated embodiment shown in FIG. 3, d is smaller than D. The resisting surface 54 resists against the other end of the spring 41 opposite to the nut 42. That is to say, the spring 41 is resisted between the nut 42 and the shaft sleeve 50.

The output shaft 60 is substantially cylindrical, and includes a second shaft body 61, a connection portion 62, an output end 63, and two resisting posts 64. The second shaft body 61, the connection portion 62, and the output end 63 are substantially coaxially connected in that order. The resisting posts 64 are substantially symmetrically formed on a periphery of the second shaft body 61 at one end of the output shaft 60 adjacent to the connection portion 62. In other embodiments, the number of the resisting posts 64 can be changed as needed. A latching portion 631 is formed on the output end 63, for latching with the driven load 300. In the embodiment, a diameter of the second shaft body 61 is greater than that of the connection portion 62, and the diameter of the connection portion 62 is greater than that of a diameter of the output end 63.

In assembly, the shaft sleeve 50 is sleeved on the input shaft 20, and the positioning posts 24 are latched in the positioning slots 532. The spring 41 is sleeved on the first shaft body 21, and the nut 42 is engaged with the threaded portion 211, such that one end of the spring 41 resists against the nut 42, and the other end of the spring 41 resists against the shaft sleeve 50. The input shaft 20 installed with the shaft sleeve 50 and the adjustment mechanism 40 is mounted on one of the support wall 12 away from the support protrusion 111 by one bearing 30 and pass through the through hole 122, and the output shaft 60 is inserted into the input shaft 20, and mounted on the other support wall 12 by the other bearing 30 and pass through the other through hole 122. The resisting posts 64 resist the concave portions 521. That is to say, the output shaft 60 is inserted in the cam end 520 of the shaft sleeve 50, and the resisting posts 64 resist the concave portions 521; the input shaft 20 is inserted in the resisting end 540 of the shaft sleeve 50, and the positioning posts 24 are engaged in the positioning slots 532. The spring 41 is compressed, such that the positioning posts 24 are stably engaged in the positioning slots 532, and the cam surfaces 52 resist against the resisting posts 64. Thus, the output shaft 60 is rotatable by engagement of the input shaft 20.

When the input shaft 20 is rotated by a torque T, the positioning posts 24 engaged in the positioning slots 532 is rotated with the shaft sleeve 50 driven by the input shaft 20, so that the cam surface 52 resists against the resisting post 64 with a resisting force defined as F. The resisting force F can be divided into an axial force defined as $F_1$ and a radial force defined as $F_2$ as illustrated in FIG. 4. A static friction defined as f exists between the cam surface 52 and the resisting post 64 because of the compression of the spring 41. When the driven load 300 connected to the output shaft 60 is in a predetermined torque range (torque amount being less than the maximum allowable overload torque limit), and the radial force $F_2$ is smaller than the static friction force f, the output shaft 60 is rotated by the input shaft 20 and drives the driven load 300. When the driven load 300 has reached the overload torque amount, and the radial force $F_2$ is greater than the static friction force f, the cam surface 52 moves relative to the resisting post 64, the resisting post 64 slides out from the concave portion 521 to the top portion 522 of the cam surface 52. Thus, the shaft sleeve 50 further compresses the spring 41, and the positioning post 24 slides out from the positioning slot 532 to the first end 5311 or the second end 5312. Because D is greater than d, the cam surface 52 is spaced from the resisting post 64. Thus, the output shaft 60 and the driven load 300 are uncoupled with the driving source 200, and are protected from damaged by the overload torque. When the input shaft 20 is rotated in an opposite rotational direction, the torque limiter 100 can return back to normal.

A torque range can be adjusted by adjusting the nut 42 with the threaded portion 211. The bearings 30 can be omitted, as long as the input shaft 20 and the output shaft 60 are rotatably mounted on the mounting seat 10. The mounting seat 10 can be omitted, as long as the input shaft 20 and the output shaft 60 are supported by other structural members, such as the driving source 200 or the driven load 300.

It is to be understood, however, that even though numerous characteristics and advantages of the disclosure have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A torque limiter, comprising:
   an input shaft configured for connecting with a driving source, the input shaft comprising a positioning post;
   an output shaft spaced from the input shaft and configured for connecting to a driven load, the output shaft comprising a resisting post;
   a shaft sleeve comprising a main body, a cam end and a resisting end, the resisting end and the cam end being formed on opposite ends of the main body, an end surface of the cam end defining a cam surface, an end surface of the resisting end defining a resisting surface, a cam groove being defined in a periphery of the main body adjacent to the resisting end; and
   an adjustment mechanism placed on the input shaft and resisting against the resisting surface;
   wherein the cam surface comprises a concave portion and a top portion connected to the concave portion; the cam groove comprises a sliding groove and a positioning slot communicating with the sliding groove, the positioning slot is defined in a side of the sliding groove adjacent to the resisting end; the output shaft is inserted into the cam end, the resisting post resists against the concave portion; the input shaft is inserted into the resisting end, and the positioning post is engaged in the positioning slot; when the driven load is reached a predetermined torque range, the output shaft is rotated by the input shaft and drives the driven load; when the driven load reaches an overload torque amount, the cam surface moves relative to the resisting post to the top portion of the cam surface, the cam surface is separated from the resisting post, such that the input shaft is uncoupled with the output shaft.

2. The torque limiter of claim 1, wherein a distance from a bottom of the positioning slot to a side surface of the sliding groove adjacent to the positioning slot is greater than a distance from the concave portion to one top portion along an axial direction of the shaft sleeve.

3. The torque limiter of claim 1, further comprising a mounting seat, wherein the input shaft and the output shaft are substantially coaxially rotatably mounted on the mounting seat.

4. The torque limiter of claim 3, wherein the mounting seat comprises a bottom wall and two support walls substantially perpendicularly extending from opposite ends of the bottom wall, the input shaft is rotatably mounted on one of the two support walls, the output shaft is rotatably mounted on the other of the two support walls.

5. The torque limiter of claim 4, wherein a mounting groove is defined in each of the two support walls, a through hole is defined in a bottom surface in the mounting groove, the torque limiter further comprises two bearings, the input shaft is rotatably mounted on the one of the two support walls by one of the two bearings, and passes through the through hole, the output shaft is rotatably mounted on the other one of the two support walls by the other of the two bearings, and passes through the through hole.

6. The torque limiter of claim 1, wherein the adjustment mechanism comprises a spring and a nut, the input shaft further comprises a threaded portion, the spring is sleeved on the input shaft, the nut is engaged with the threaded portion, one end of the spring resists against the shaft sleeve, the other end of the spring resists against the nut, a compression amount of the spring is adjustable by the nut, and thereby the predetermined torque range of the driven load is adjustable.

7. The torque limiter of claim 1, wherein the cam surface further comprises a connection portion connecting the concave portion to the top portion, when the resisting post moves relative to the cam surface, the resisting post slides to the top portion through the connection portion.

8. The torque limiter of claim 1, wherein the cam groove further comprises a guiding section communicating with the sliding groove and the positioning slot, when the positioning post slides out from the positioning slot, the positioning post is guided via the guiding section to one end of the sliding groove.

9. A torque limiter, comprising:
a mounting seat;
an input shaft rotatably mounted on the mounting seat and configured for connecting to a driving source, and the input shaft comprising a positioning post;
an output shaft rotatably mounted on the mounting seat, spaced from the input shaft and configured for connecting to a driven load, the output shaft comprising a resisting post;
a shaft sleeve comprising a cam end and a resisting end opposite to the cam end, an end surface of the cam end defining a cam surface, an end surface of the resisting end defining a resisting surface, a cam groove being defined in a periphery of the shaft sleeve adjacent to the resisting end; and
an adjustment mechanism placed on the input shaft and resisting against the resisting surface;
wherein the cam surface comprises a concave portion and a top portion connected to the concave portion; the cam groove comprises a sliding groove and a positioning slot communicating with the sliding groove, the positioning slot is defined in a side of the sliding groove adjacent to the resisting end; the output shaft is inserted into the cam end, the resisting post resists against the concave portion; the input shaft is inserted into the resisting end, and the positioning post is engaged in the positioning slot; a distance from a bottom of the positioning slot to a side surface of the sliding groove adjacent to the positioning slot is greater than a distance from the concave portion to one top portion along an axial direction of the shaft sleeve; when the driven load is reached a predetermined torque range, the output shaft is rotated by the input shaft and drives the driven load; when the driven load is reached an overload torque amount, the cam surface moves relative to the resisting post to the top portion of the cam surface, the cam surface is separated from the resisting post, such that the input shaft is uncoupled with the output shaft.

10. The torque limiter of claim 9, wherein the input shaft and the output shaft are substantially coaxial.

11. The torque limiter of claim 10, wherein the mounting seat comprises a bottom wall and two support walls substantially perpendicularly extending from opposite ends of the bottom wall, the input shaft is rotatably mounted on one of the two support walls, the output shaft is rotatably mounted on the other of the two support walls.

12. The torque limiter of claim 11, wherein a mounting groove is defined in each of the two support walls, a through hole is defined in a bottom surface in the mounting groove, the torque limiter further comprises two bearings, the input shaft is rotatably mounted on the one of the two support walls by one of the two bearings, and passes through the through hole, the output shaft is rotatably mounted on the other one of the two support walls by the other of the two bearings, and passes through the through hole.

13. The torque limiter of claim 12, wherein the adjustment mechanism comprises a spring and a nut, the input shaft further comprises a threaded portion, the spring is sleeved on the input shaft, the nut is engaged with the threaded portion, one end of the spring resists against the shaft sleeve, the other end of the spring resists against the nut, a compression amount of the spring is adjustable by the nut, and thereby the predetermined torque range of the driven load is adjustable.

14. The torque limiter of claim 9, wherein the cam surface further comprises a connection portion connecting the concave portion to the top portion, when the resisting post moves relative to the cam surface, the resisting post slides to the top portion through the connection portion.

15. The torque limiter of claim 9, wherein the cam groove further comprises a guiding section communicating with the sliding groove and the positioning slot, when the positioning post slides out from the positioning slot, the positioning post is guided via the guiding section to one end of the sliding groove.

* * * * *